United States Patent [19]

Robinson et al.

[11] Patent Number: 4,624,294
[45] Date of Patent: Nov. 25, 1986

[54] WOOD THICKNESS ATTACHMENT

[76] Inventors: Charles A. Robinson; Steven B. Perry, both of 31 Ensign Ave., Barnegat, N.J. 08005; George Spector, 233 Broadway, Rm. 3615, New York, N.Y. 10007

[21] Appl. No.: 759,754

[22] Filed: Jul. 29, 1985

[51] Int. Cl.[4] .......................... B27B 31/00; B27C 1/12
[52] U.S. Cl. .................................. 144/253 F; 83/438; 83/444; 83/448; 144/253 J
[58] Field of Search ............ 144/253 R, 253 F, 253 J; 83/438, 444, 448

[56] References Cited

U.S. PATENT DOCUMENTS

| | | | |
|---|---|---|---|
| 1,947,885 | 1/1934 | Tautz | 144/253 J |
| 2,104,158 | 1/1938 | Hedpeth | 144/253 J |
| 2,612,914 | 10/1952 | Reynolds | 144/253 F |
| 4,432,263 | 2/1984 | Kowalchuk | 83/438 |

Primary Examiner—W. D. Bray

[57] ABSTRACT

A wood thickness attachment for a jointer planer that has an angle/wood guide and cutter roller is provided. The attachment is attached and adjusted to the angle/wood guide and includes a roller guide that will engage a piece of wood which can be cut by the cutter roller and modified wood thickness attachment, leveling and adjustment features are built into the roller guide to compensate for various height thicknesses of the piece of wood.

4 Claims, 4 Drawing Figures

WOOD THICKNESS ATTACHMENT

BACKGROUND OF THE INVENTION

The instant invention relates generally to jointer planers and more specifically it relates to a wood thickness attachment for a jointer planer.

Numerous jointer planers have been provided in prior art that are adapted to receive attachments thereto. For example, U.S. Pat. Nos. 1,791,335; 2,589,865 and 2,624,382 all are illustrative of such prior art. While these units may be suitable for the particular purpose to which they address, they would not be as suitable for the purposes of the present invention as heretofore described.

SUMMARY OF THE INVENTION

A principle object of the present invention is to provide a wood thickness attachment for a jointer planer that will in an economical way for the average small wood working craftsman, produce a finished artical both straight or angled, without the expense of purchasing a highly expensive piece of machinery.

Another object is to provide a wood thickness attachment for a jointer planer that can quickly be attached and adjusted to an angle and wood guide of the jointer planer to operate in conjunction with the jointer planer.

An additional object is to provide a wood thickness attachment for a jointer planer that has leveling and adjustment features for the roller guide built into the thickness adjustment plate to compensate for various height thicknesses of the wood work pieces.

A further object is to provide a wood thickness attachment for a jointer planer that is economical in cost to manufacture.

A still further object is to provide a wood thickness attachment for a jointer planer that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
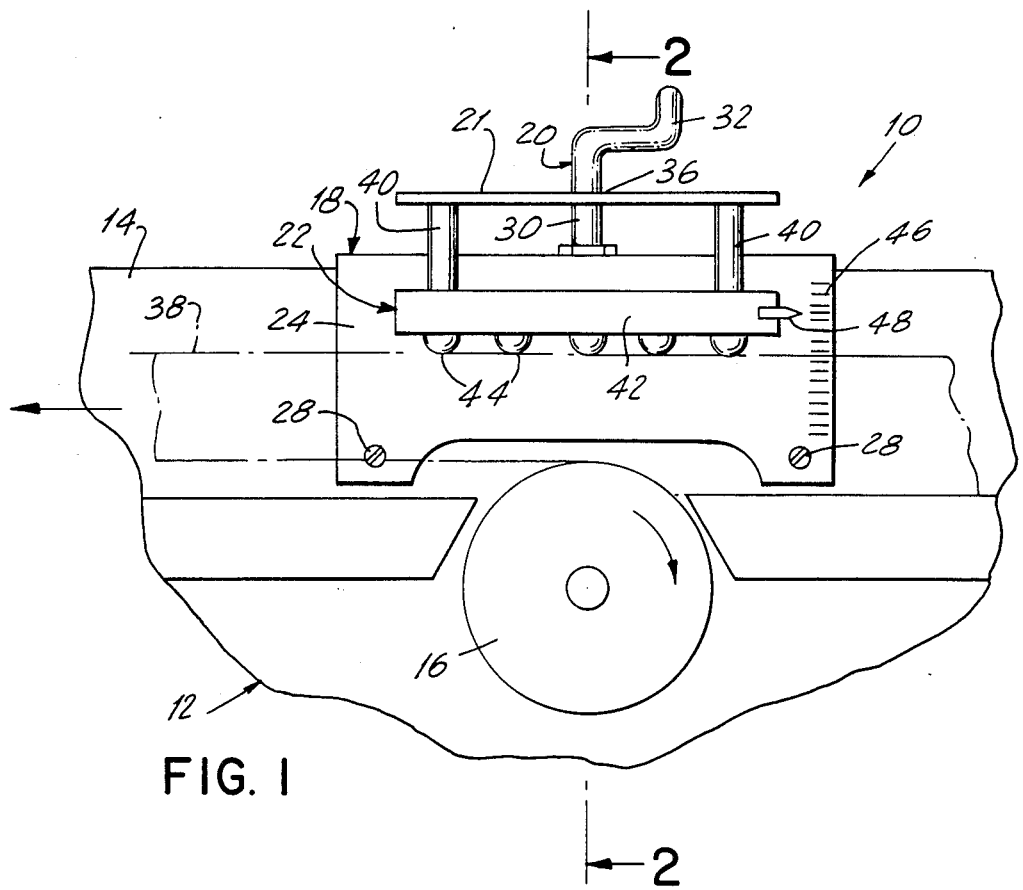
FIG. 1 is a top view of the invention mounted to an angle and wood guide of a jointer planer.
Figure 2:
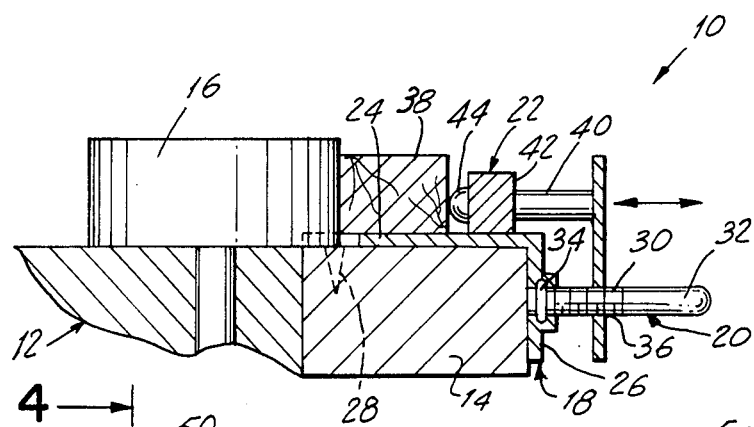
FIG. 2 is a cross sectional view taken along line 2—2 in FIG. 1 showing construction of the attachment.

Turning now descriptively to the drawings, in which similar reference characters denote similar elements throughout the several views, FIGS. 1 and 2 illustrates a wood thickness attachment 10 for a jointer planer 12 that has an angle/wood guide 14 and cutter roller 16. The attachment 10 contains an L-shaped attachment bracket 18, an adjustment rod 20, a thickness adjustment plate 21, and a roller guide 22.

The L-shaped attachment bracket 18 has two legs 24 and 26. The first leg 24 is affixed to the angle/wood guide 14 of the jointer planer 12 by screws 28.

The adjustment rod 20 has a threaded shaft 30 with an integral crank handle 32 rotatably affixed at 34 to second leg 26 of the L-shaped attachment bracket 18. The thickness adjustment plate 21 is threadably in engagement with the threaded shaft 30 of the adjustment rod 20 at 36.

The roller guide 22 is affixed transversely to the thickness adjustment plate 21 above the adjustment rod 20 when a piece of wood 38 is placed onto the jointer planer 12 the crank handle 32 can be manually turned in which the roller guide 22 will engage the piece of wood 38 which can be cut by the cutter roller 16 of the jointer planer 12.

The roller guide 22 includes a pair of spaced arms 40, 40 transversely affixed to upper portion of the thickness adjustment plate 21. A bar 42 is transversely affixed to and extends between the arms 40, 40. A plurality of balls 44 are rotatably mounted within side of the bar 42 to engage the piece of wood 38.

A scale 46, such as inches or metrics, is placed on the first leg 24 of the L-shaped attachment bracket 18. A pointer 48 is affixed to end of the bar 42 adjacent the scale 46 to determine the thickness to cut the piece of wood 38 by the cutter roller 16 of the jointer planer 12.

Figure 3:
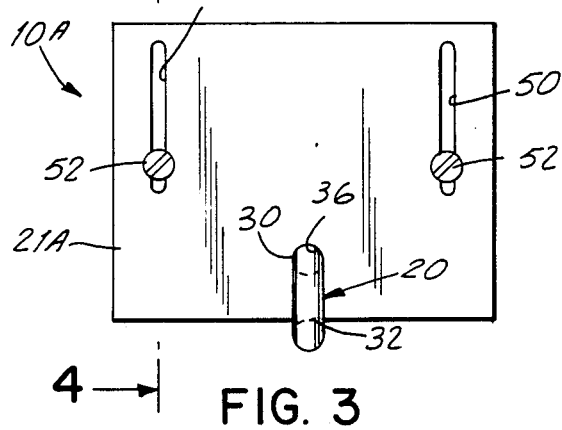
FIG. 3 is an end view of a modified thickness adjustment plate.
Figure 4:
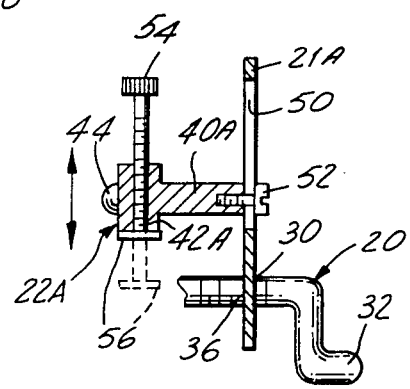
FIG. 4 is a cross sectional view taken along line 4—4 in FIG. 3 showing the leveling and adjustment features of the roller guide.

FIGS. 3 and 4 show a modified wood thickness attachment 10A. The thickness adjustment plate 21A has a pair of spaced vertical slots 50, 50 therein. A pair of adjustment bolts 52, 52 are provided. Each bolt 52 engages with each slot 50 and one arm 40A of the roller guide 22A so that the roller guide can be vertically adjusted.

At least one leveling bolt 54 that has a foot 56 is vertically threaded through the bar 42A. The foot 56 engages with the first leg 24 of the L-shaped attachment bracket 18 to stabalize the roller guide 22A to compensate for various height thicknesses of the piece of wood 38.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A wood thickness attachment for a jointer planar, said planar having an angle/wood guide and a rotary cutter wherein said attachment comprises:
   (a) an L-shaped attachment bracket having a first horizontal leg mounted on the upper horizontal surface of said guide and a second vertical leg adjacent the vertical surface of said guide;
   (b) an adjustment rod having a threaded shaft with a crank handle rotatably affixed transversely to said second leg of said bracket;
   (c) a thickness adjustment plate threadably mounted on said shaft;
   (d) a roller guide affixed transversely to said plate above said adjustment rod so that when a piece of wood is placed onto said jointer planer abutting said roller guide actuation of said crank handle will cause said roller guide to urge said piece of wood against said cutter.

2. A wood thickness attachment as recited in claim 1, wherein said roller guide includes:
(a) a pair of spaced arms transversely affixed to an upper portion of said thickness adjustment plate;
(b) said roller guide comprising a bar transversely affixed to and extending between said arms; and
(c) a plurality of balls rotatably mounted within the side of said bar to engage said piece of wood.

3. A wood thickness attachment as recited in claim 2, further comprising:
(a) a scale placed on said first leg of said L-shaped attachment bracket; and
(b) a pointer affixed to end of said bar adjacent said scale to determine the thickness to cut said piece of wood.

4. A wood thickness attachment as recited in claim 3, further comprising:
(a) said thickness adjustment plate having a pair of spaced vertical slots therein;
(b) a pair of adjustment bolts, each said bolts engaging with each slot and one of said arms of said roller guide so that said roller guide can be vertically adjusted;
(c) at least one leveling bolt having a foot, said leveling bolt being vertically threaded through said bar so that said foot engages with said first leg of said L-shaped attachment bracket to stabilize said roller guide to compensate for various height thickness of said piece of wood.

* * * * *